Oct. 29, 1963   J. R. JOHNSON   3,108,492
GEAR DRIVE FOR DETEARING APPARATUS
Original Filed Aug. 21, 1959   3 Sheets-Sheet 1
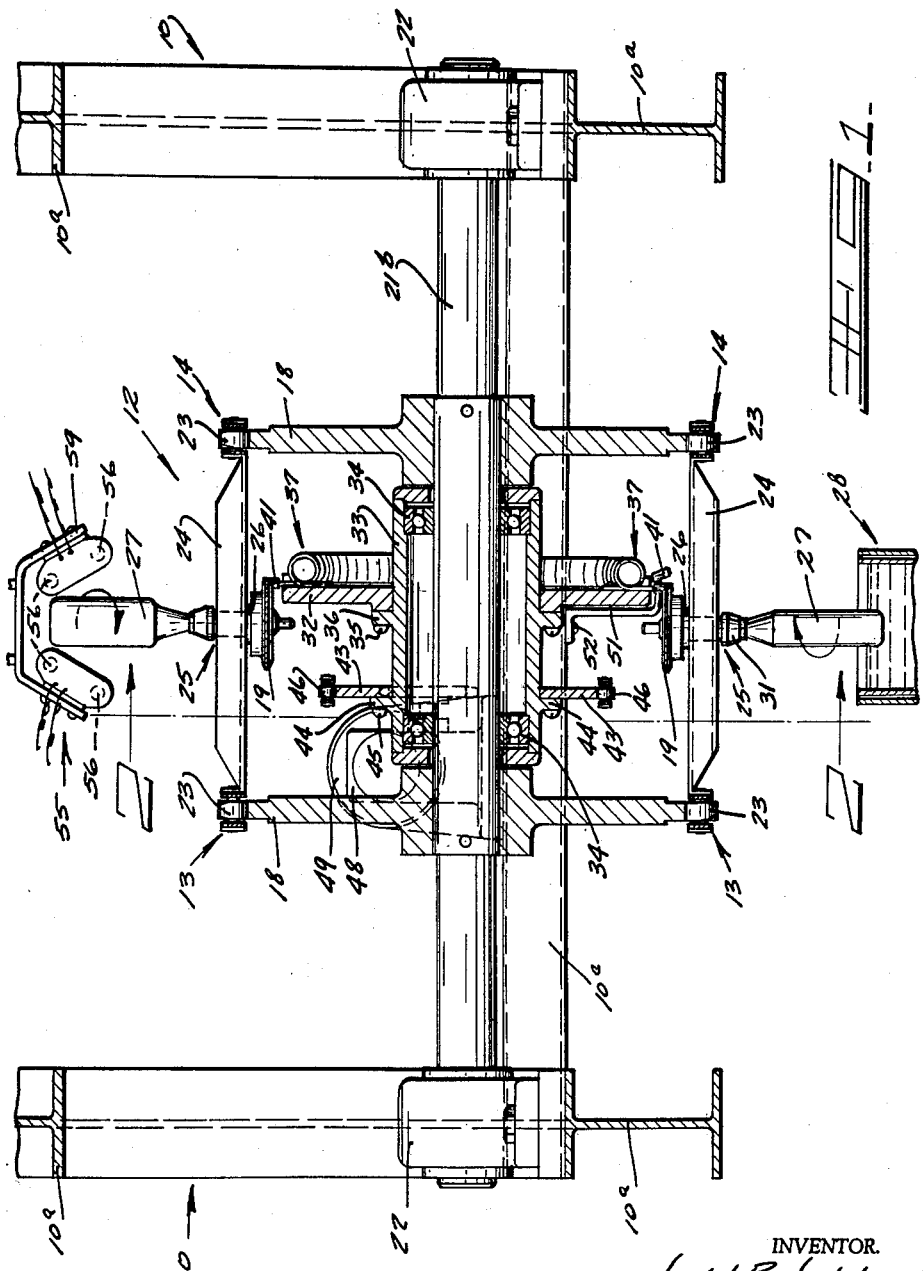
INVENTOR.
John R. Johnson
BY J. R. Nelson and
W. A. Schaich
ATTORNEYS.

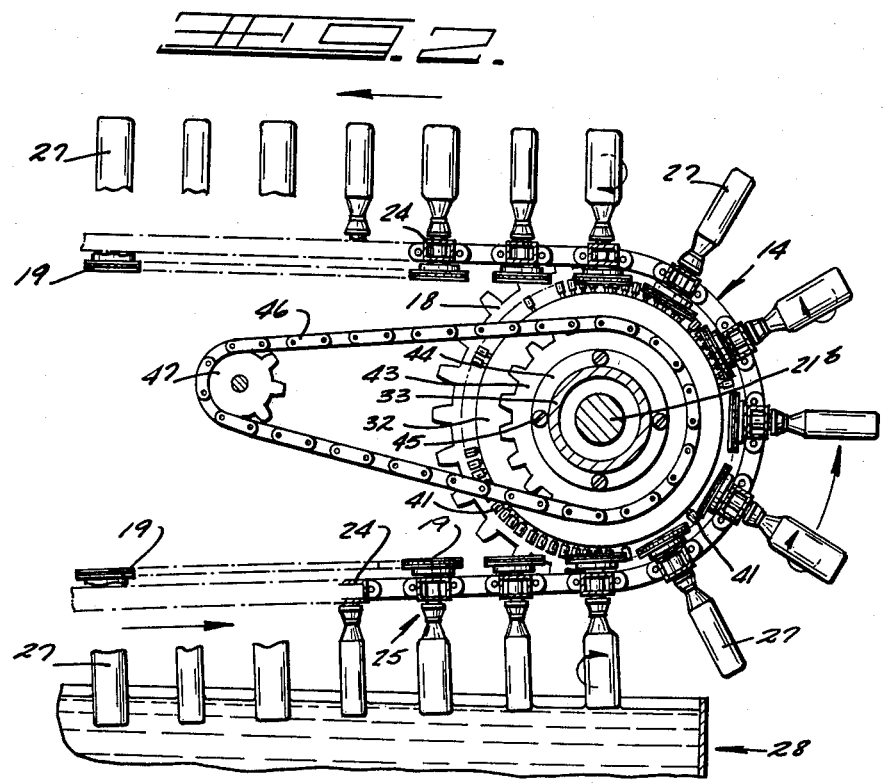

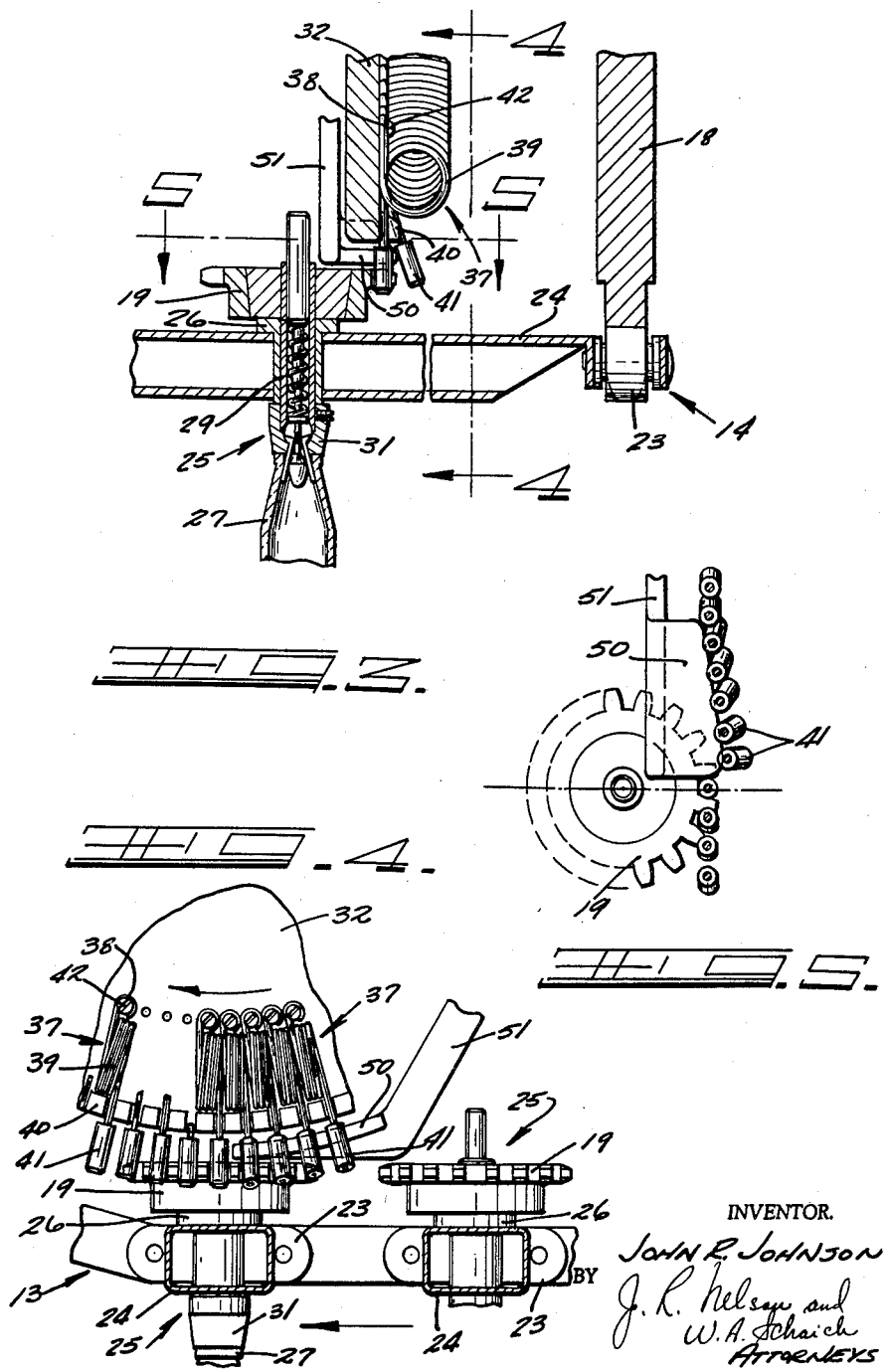

United States Patent Office 3,108,492
Patented Oct. 29, 1963

3,108,492
GEAR DRIVE FOR DETEARING APPARATUS
John R. Johnson, Toledo, Ohio, assignor to Owens-Illinois Glass Company, a corporation of Ohio
Original applications Aug. 21, 1959, Ser. No. 835,361, and Oct. 20, 1960, Ser. No. 63,818. Divided and this application Dec. 28, 1961, Ser. No. 162,752
3 Claims. (Cl. 74—660)

The present invention relates to treating an article to obtain a smooth and attractive coating thereon by the application of a liquid coating material, and, more specifically, to apparatus for controlling the distribution of the liquid coating material after applied to cause any tear or droplet formation at the lowermost part of the article to flow or merge smoothly into the coating. This distribution control has been referred to in the art as "detearing," which term designates removal or elimination of the drop or drops of coating material that usually accumulate at the bottom of an article after the coating is applied and while it is still flowable.

An important object of the invention is to provide mechanical detearing in a continuous article-coating machine process that is performed automatically as part of the manufacturing process.

It is also an object of the present invention to provide a novel mechanical drive for imparting rotation to articles as they are conveyed past a driving pinion. In this respect, the invention has, as a further object, the provision of a new gear train, and more specifically one in which the driver has yieldable tooth elements and a cam for assisting in bringing these elements into mesh with teeth of a driven gear.

The above objects as well as other objects and advantages of the invention will be apparent to those skilled in the art from the following detailed description, taken in conjunction with the annexed sheets of drawings, on which is presented for purposes of illustration only, a preferred and practical embodiment of the invention.

FIG. 1 is a sectional elevational view, showing the invention as employed on a machine having utility for the manufacture of vinyl resin coated glass articles, such as glass aerosol bottles, and illustrates the novel gear train of the invention.

FIG. 2 is a detailed side sectional elevational view taken along lines 2—2 of FIG. 1.

FIG. 3 is an enlarged fragmentary sectional elevational view of a bottle chuck and the cam mechanism of the novel gear apparatus, shown in the lower portion of FIG. 1, which illustrates a novel mechanical feature of the invention for bringing the driving elements into driving engagement with the teeth of the driveable pinion on the bottle chuck without interference.

FIG. 4 is a fragmentary side elevational view taken along line 4—4 of FIG. 3.

FIG. 5 is a fragmentary plan view taken along lines 5—5 of FIG. 3.

This application is a divisional of my earlier filed copending applications Serial No. 63,818, filed October 20, 1960, and Serial No. 835,361, filed August 21, 1959.

As a practical illustration of the invention, a preferred embodiment will now be described.

According to the illustrated preferred embodiment of the present invention, bottles are loaded to the bottle-coating machine by inserting them at their necks over the end of a holding chuck which grasps the bottle internally and holds it in place on the machine. A plurality of chucks are provided by mounting on the cross slats of an endless chain carriage. This carriage is moved through an established path of travel which presents the bottles at various stations throughout the machine for performing the various steps thereon to manufacture a plastisol coated glass aerosol bottle. As may be seen from the drawings, the bottles extend perpendicular to the path of the chain after they are chucked onto the machine.

Referring to FIG. 1, a structural machine frame 10 supports a movable carriage, indicated generally as 12, comprised of two parallel endless reaches of chain 13 and 14 (see also FIG. 2) which are in mesh with the teeth on a pair of parallel and spaced-apart sprockets 18. The carriage is driven continuously counterclockwise on FIG. 2 by a suitable driving connection. The pair of sprockets 18 are keyed onto a horizontal shaft, as indicated by 21b. The shaft is mounted in conventional journal boxes of the character shown at 22, which are supported on the horizontal members 10a of the frame 10. The chains 13 and 14 are made up of individual links, successively connected, the links engaging teeth of the sprocket. At equally spaced distances along the chains 13 and 14 are included in their make-up special links 23 (FIG. 1) constructed for fastening cross bars 24 which are disposed parallel to each other and extend between the chains 13 and 14, the combination of the chains 13 and 14, these special links 23 therein, and the cross bars 24, comprise the movable carriage means. The plurality of bottle chucks indicated as 25 are rotatably mounted in the cross bars 24 by a bushing 26 rigidly fabricated to the latter. As mentioned, this mounting disposes the chucks perpendicularly, so that they depend outwardly from the cross bars and carry the chuck bottles with the central axis of the latter being disposed at right angles to the path of travel of the movable carriage. The structural details of the chucks 25 are fully set forth in my U.S. Patent 2,882,061.

The drawings herein disclose, for the sake of simplicity of illustration, one longitudinal line of the chucks 25 aligned successively on the cross bars 24 of the carriage means. However, any number of lines may be constructed and accommodated by the carriage means within the limits of the lateral space available between the pairs of sprockets which obviously define the spacing between the chains 13 and 14.

The just described carriage means is movable continuously in one direction by any suitable drive means, such as an electric motor and geared speed reduction unit (not shown). The drive is operated so that the chucks 25 and their chucked bottles 27 are moved from left to right through the dipping tank 28 (FIG. 2). As the carriage advances the bottles, their path of movement is gradually inclined upwardly toward the periphery of the sprockets 18.

The foregoing being given as an illustration of the treatment of the bottle for applying a coating liquid coating material thereto, the bottle is next subjected to the detearing method of this invention, this method being performed by the presently described novel form of apparatus.

As the carriage means 12 passes around the sprockets 18, it travels through a defined arcuate reversing segment of its path which, in effect, inverts the bottles 27 from their substantially vertical attitude or position at the lower side of the sprockets 18 to an inverted vertical position at the upper side of these sprockets.

Referring briefly to FIG. 3, it is seen that the bottle chucks 25 are provided with the bushing 26 held in the cross bar 24. Journaled in the bushing 26 is a body member 29 which has a rigidly attached lower gripper head 31 and an upper pinion 19. The parts 29, 31, and 19 are thus rotatable within the bushing 26 about the central axis of the chuck.

Referring now to FIGS. 1 and 2, it is seen that an annular wheel or disk member 32 is rotatably mounted with respect to the shaft 21b by a spider 33 carried on roller bearings 34, the spider being thus mounted in place on the shaft 21b between the sprockets 18. The disk member 32 is fastened to the spider 33 by cap screws 35 extending through the annular flange 36 of the spider member. The disk 32 and spider 33 thus assembled form the hub portion of a gear. The disk member, therefore, is mounted on the shaft 21b for rotation independent of the shaft, the latter being driven by the sprockets 18 as the carriage chains 13 and 14 are moved therearound. On the disk member 32 is provided a plurality of yieldable pin assemblies 37.

By referring to FIGS. 3–5, as well as FIG. 1, it is seen that each of the pin assemblies 37 is constructed as follows: An upper looped end 38 forms an eyelet by which each assembly 37 is fastened to the disk member 32. Extending from the eyelet 38 is a length of tubular spring steel that is wound as a coil spring body portion 39 which ultimately straightens and extends radially along the disk member through a pair of adjacent slot-defining projections 40 at the periphery of the latter. At the outer end of these coiled body portions 39 is a rotatably mounted cylindrical pin 41. These pins 41 are of a size that will correspond with and mesh in the gear teeth of the pinion 19 of each of the chucks. Thus, as the carriage means moves the chucks and their pinions 19 through the reversing path defined by the sprockets 18, the pins 41 serve as teeth of a gear element in imparting rotation to the chuck pinions. The speed of this rotation will depend upon the relative rotation between the disk member 32 and the sprockets 18. The disk member 32 may be held stationary or may be independently rotated. When the disk member is rotated, such rotation is imparted through an annular sprocket 43 bolted to the projection 44 of the spider 33 by cap screws 45 (FIGS. 1 and 2). The sprocket 43 is driven through the endless drive chain 46 running over the drive gear 47 (see FIG. 2). The drive gear 47 is mounted on the output shaft of a variable speed gear reduction unit 48 which is driven by a reversible electric motor 49. The items numbered 48 and 49 just described are not herein disclosed in detail, since I have preferred to use a commercially available variable speed drive sold under the trade name of "Master Speed Ranger" by the Master Electric Company, St. Louis, Missouri.

By the use of the variable speed drive just described, the disk member 32 and its driving pins 41, which are comparable to gear teeth, may be rotated in either direction, and at any selected speed of rotation that may be needed for imparting the desired speed of rotation to the bottles through the pinions 19 of the chucks 25. For example, as the bottles are being rotated bodily about shaft 21b in a counterclockwise direction (FIG. 2), the variable speed drive 48 and 49 may be operated to impart clockwise rotation to the disk member 32. This will rotate the bottles in a clockwise direction about their own central axis. Any desired speed of rotation of the bottles about their own axis may be obtained through adjustment of the speed of the driving disk 32 by the variable speed drive units 48, 49. As will be noted from the just stated example of operation, the disk member 32 was rotated in a direction counter to the direction of the bodily movement of the chucks and bottles by the carriage means. This tends to multiply the bottle rotating speed. If, however, the disk member 32 is rotated in the counterclockwise direction (FIG. 2), or in the same direction as the movement of the carriage, the speed relationship will be different. Through this latter direction of rotation of disk 32, the bottles may be rotated more slowly with a given speed of the drive gear 47. It should be readily understood, however, that any rotational speed combination may be obtained by this apparatus, and such speed variations are readily adjustable. Also, it should be readily understood without further description that the bottles may be rotated axially by holding the disk 32 stationary.

Another novel feature of the apparatus of the invention includes a means for bringing the above described pins 41 through their assemblies 37 into mesh with the teeth of the pinions 19 of the chucks 25. As described, each of the pins 41 is resiliently mounted so as to be yieldable in an axial direction relative to the disk member 32 which carries them. A cam element 50 is located in a fixed position on the machine. The cam 50 is rigidly attached to a bracket 51 which is bolted at 52 to the underside of a flange of the transverse I-beam support 10c of the machine frame. The cam 50 is located in spaced relationship just prior to the point where the pins 41 will come into mesh with the teeth of the pinions 19 of the chucks as the latter are carried into the reversing path of the sprockets 18. This cam terminates along a radial plane of the gear 32 and, as the diametrical center of the moving pinions arrive at a position in this plane, the pin-type teeth 41 will fall into mesh with the teeth of the pinion 19. This position is shown detailed on FIGS. 4 and 5. Thus, as the disk member 32 is rotating (on the figures, a clockwise direction), it carries the pins successively over the stationary cam 50, whereupon the coils 39 are tightened by the pins yielding laterally outwardly. As the pins 41 run off of the cam 50, the coils 39 spring the pins 41 laterally toward the gear teeth of the pinions 19 and they drop into mesh therewith. This construction prevents any interference between the pins and the gear teeth as they come into mesh, and, since the pins 41 are mounted resiliently, they are enabled to yield and slide into mesh in the event an initial interference or engagement is imminent. This feature decreases maintenance on the equipment and prolongs the operating life of the chucks.

Modifications may be resorted to within the spirit and scope of the appended claims.

I claim:

1. The combination of a driven pinion, a driving gear member mounted for rotation and having matching tooth elements yieldable axially thereof, means moving said pinion for bringing it into mesh with said tooth elements, means connected for rotating said driving gear member, and a stationary cam engaging said tooth elements prior to the point of meshing with said pinions causing them to yield axially away from the pinion, said cam terminating to permit said teeth to mesh with the teeth of the pinion.

2. The combination of a driven pinion, a driving gear member mounted for rotation and having matching teeth elements yieldable axially thereof, each of said tooth elements comprising a coil winding of an elastic material, one end thereof attached to said gear element, the other end thereof depending radially at the periphery of said gear element, a roller pivotally mounted on said other end of said coil, said coil being disposed to permit axial yielding movement of the roller, means moving said pinion for bringing it into mesh with said rollers, means connected for rotating said driving gear member, and a stationary cam engaging said rollers prior to the point of meshing with said pinion causing them to yield axially away from the pinion, said cam terminating to permit said rollers to mesh the teeth of the pinion.

3. A gear comprising a central hub mounted for rotation, a plurality of yieldable bodies, means fastening said bodies at equally spaced distances circumferentially on said hub, said bodies depending radially outwardly of said hub, and a roller member mounted on each said depending body, said members in their aggregate being arranged to form axially yieldable teeth of said gear.

No references cited.